US007249228B1

(12) United States Patent
Agarwal et al.

(10) Patent No.: US 7,249,228 B1
(45) Date of Patent: Jul. 24, 2007

(54) REDUCING THE NUMBER OF BLOCK MASKS REQUIRED FOR PROGRAMMING MULTIPLE ACCESS CONTROL LIST IN AN ASSOCIATIVE MEMORY

(75) Inventors: Amit Agarwal, Union City, CA (US); Venkateshwar Rao Pullela, San Jose, CA (US); Qizhong Chen, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 522 days.

(21) Appl. No.: 10/791,632

(22) Filed: Mar. 1, 2004

(51) Int. Cl.
*G06F 12/00* (2006.01)

(52) U.S. Cl. .................. 711/154; 711/100; 711/108; 718/100; 718/102; 718/103; 718/104; 370/395.7; 370/395.72; 370/411; 370/412; 370/413; 370/414; 370/415; 370/416; 719/320

(58) Field of Classification Search ................ 711/108, 711/154
See application file for complete search history.

(56) References Cited

U.S. PATENT DOCUMENTS

| 5,187,790 | A * | 2/1993 | East et al. ................... 719/316 |
|---|---|---|---|
| 6,295,576 | B1 | 9/2001 | Ogura et al. |
| 6,374,326 | B1 | 4/2002 | Kansal et al. |
| 6,377,577 | B1 | 4/2002 | Bechtolsheim et al. |
| 6,389,506 | B1 | 5/2002 | Ross et al. |
| 6,467,019 | B1 | 10/2002 | Washburn |
| 6,526,474 | B1 | 2/2003 | Ross |
| 6,535,951 | B1 | 3/2003 | Ross |
| 6,606,681 | B1 | 8/2003 | Uzun |
| 6,643,260 | B1 | 11/2003 | Kloth et al. |
| 6,651,096 | B1 | 11/2003 | Gai et al. |
| 6,658,002 | B1 | 12/2003 | Ross et al. |
| 6,658,458 | B1 | 12/2003 | Gai et al. |
| 6,687,144 | B2 | 2/2004 | Batson et al. |
| 6,715,029 | B1 | 3/2004 | Trainin et al. |
| 6,717,946 | B1 | 4/2004 | Hariguchi et al. |
| 6,725,326 | B1 | 4/2004 | Patra et al. |
| 6,738,862 | B1 | 5/2004 | Ross et al. |
| 6,775,737 | B1 | 8/2004 | Warkhede et al. |
| 6,839,256 | B1 * | 1/2005 | Proebsting et al. ........... 365/49 |
| 6,862,281 | B1 | 3/2005 | Chandrasekaran |
| 6,871,262 | B1 | 3/2005 | Oren et al. |
| 6,871,265 | B1 | 3/2005 | Oren et al. |
| 6,910,097 | B1 * | 6/2005 | Srinivasan et al. ......... 711/108 |
| 6,961,808 | B1 | 11/2005 | Oren et al. |
| 6,970,971 | B1 | 11/2005 | Warkhede et al. |
| 7,002,965 | B1 * | 2/2006 | Cheriton ................ 370/395.32 |
| 2003/0231631 | A1 | 12/2003 | Pullela |
| 2004/0030802 | A1 | 2/2004 | Eatherton et al. |
| 2004/0030803 | A1 | 2/2004 | Eatherton et al. |
| 2004/0100950 | A1 | 5/2004 | Basu et al. |
| 2004/0170171 | A1 | 9/2004 | Kanekar et al. |
| 2004/0170172 | A1 | 9/2004 | Pullela et al. |
| 2004/0172346 | A1 | 9/2004 | Kanekar et al. |
| 2005/0010612 | A1 | 1/2005 | Enderwick et al. |
| 2005/0114602 | A1 | 5/2005 | Ngai et al. |
| 2005/0157712 | A1 | 7/2005 | Rangaranjan et al. |

* cited by examiner

*Primary Examiner*—Sanjiv Shah
*Assistant Examiner*—Zhuo H. Li
(74) *Attorney, Agent, or Firm*—The Law Office of Kirk D. Williams

(57) ABSTRACT

Mechanisms for reducing the number of block masks required for programming multiple access control lists in an associative memory are disclosed. A combined ordering of masks corresponding to multiple access control lists (ACLs) is typically identified, with the multiple ACLs including n ACLs. An n-dimensional array is generated, wherein each axis of the n-dimensional array corresponds to masks in their requisite order of a different one of the multiple ACLs. The n-dimensional array progressively identifies numbers of different masks required for subset orderings of masks required for subsets of the multiple ACLs. The n-dimensional array is traversed to identify a sequence of masks corresponding to a single ordering of masks including masks required for each of the multiple ACLs.

30 Claims, 16 Drawing Sheets

ACL-1
                                301
COST                    ⏞
ARRAY
 300 ↘     0      A      B      C      D      D
       ┼───────────────────────────────────────
     0 │   0      1      2      3      4      4
       │  (0,0)  (1,0)  (1,0)  (1,0)  (1,0)  (2,0)
       │
   ⎧ D │   1      2      3      4      4      4
   ⎪   │  (0,1)  (1,0)  (1,0)  (1,0)  (1,1)  (1,2)
   ⎪   │
   ⎪ B │   2      3      3      4      5      5
ACL-2⎨  │  (0,1)  (1,0)  (1,1)  (1,0)  (1,0)  (0,1)
 302 ⎪  │
   ⎪ C │   3      4      4      4      5      5
   ⎪   │  (0,1)  (1,0)  (0,1)  (1,1)  (1,0)  (2,0)
   ⎪   │
   ⎪ A │   4      4      5      5      6      6
   ⎩ ↓ │  (0,1)  (1,1)  (1,0)  (0,1)  (1,0)  (0,1)

FIGURE 3A

PSEUDO-CODE
500

```
Min_Masks(X, Y, m, n)
    V[0,0] = 0
    for i = 0 to m
        for j = 0 to n
            if(i != 0 and j != 0)
                V[i, j] = V[i-k1, j-k2]+1 where k1 and k2
                                          are computed from eqn. 1
                c[i,j].x = k1
                c[i,j].y = k2
    return V, c Find_Optimized_Acl(X, Y, m, n, C)
    i=m
    j=n
    p=m+n
    while( i!=0 and j!=0)
        for k 1 to c[i,j].x
            z_p = x_{i-k+1}
            p = p -1
        for k 1 to c[i,j].y
            z_p = y_{j-k+1}
            p = p -1
        i = i - c[i,j].x
        j = j - c[i,j].y
    return Z
```

FIGURE 5

REDUCING THE NUMBER OF BLOCK MASKS REQUIRED FOR PROGRAMMING MULTIPLE ACCESS CONTROL LIST IN AN ASSOCIATIVE MEMORY

TECHNICAL FIELD

One embodiment of the invention relates to communications and computer systems, especially networked routers, packet switching systems, and other devices using associative memories (e.g., content-addressable memories); and more particularly, one embodiment relates to reducing the number of block masks required for programming multiple access control lists in an associative memory.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

A network device, such as a switch or router, typically receives, processes, and forwards or discards a packet based on one or more criteria, including the type of protocol used by the packet, addresses of the packet (e.g., source, destination, group), and type or quality of service requested. Additionally, one or more security operations are typically performed on each packet. But before these operations can be performed, a packet classification operation must typically be performed on the packet.

Packet classification as required for, inter alia, access control lists (ACLs) and forwarding decisions, is a demanding part of switch and router design. The packet classification of a received packet is increasingly becoming more difficult due to ever increasing packet rates and number of packet classifications. For example, ACLs typically require matching packets on a subset of fields of the packet header or flow label, with the semantics of a sequential search through the ACL rules.

Access control and quality of service features are typically implemented based on programming contained in one or more ACLs. To implement features in hardware, these multiple ACL lists are typically combined into one list, which can be used for programming and associative memory. Various techniques are known for combining these items, such as Binary Decision Diagram (BDD) and Order Dependent Merge (ODM). For example, if there are two ACLs A (having entries A1 and A2) and B (having entries B1 and B2, then ODM combines these original lists to produce one of two cross-product equivalent ordered lists, each with four entries: A1B1, A1B2, A2B1, and A2B2; or A1B1, A2B1, A1B2, and A2B2. These four entries can then be programmed into an associative memory and an indication of a corresponding action to be taken placed in an adjunct memory. Lookup operations can then be performed on the associative and adjunct memories to identify a corresponding action to use for a particular packet being processed. There are also variants of ODM and BDD which may filter out the entries which are unnecessary as their values will never allow them to be matched. Merged entries which are order independent can be sorted based on common masks, and programmed into the block masks of an associative memory (which typically does not significantly reduce the number of block masks required), or can be programmed in any order in an associative memory where each entry has its own mask field. Nonconsecutive merged entries which remain order dependent must maintain their ordering when programmed into an associative memory, and thus cannot be rearranged to reduce or eliminate redundant masks when entries are masked using block masks. Also, one or more of these techniques may produce an increased number of entries and/or block masks required for programming the resultant entries into an associative memory.

An example of an associative memory using block masks is described in Ross et al., "Block Mask Ternary CAM", U.S. Pat. No. 6,389,506, issued May 12, 2002, which is hereby incorporated by reference. In a nutshell, a block mask is a mask that is applied to each entry of a block of entries. Such an associative memory typically has numerous blocks and corresponding block masks. FIG. 1A shows one such prior art associative memory 100, having multiple blocks 110, 120, and 130, each with corresponding block masks 111, 121, and 131 for blocks of associative memory entries 112, 122, and 132.

FIG. 1B illustrates a prior art approach for combining masks of two ACLs 150 and 152, having masks as shown with their corresponding required ordering. The result of a first approach for combining these lists is shown in ordering 155, in which entries of ACL-2 152 are concatenated at the end of entries of ACL-1 150 to produce an ordering that requires m masks, where m is the sum of the number of masks required for each of ACLs 150 and 152. The results 156 and 157 of a second approach is similar, but allows the mask at the end of a list to be used by both ACLs 150 and 152 if the last required mask of one ACL is the same mask as first required by the other ACL, then the number of masks required is m minus a small number of overlapping masks. However, this does not significantly reduce the overall number of masks required, which can be a problem as the number of different masks in the required order is directly correlated to the number of ACL entries which can be stored in a block mask associative memory. Thus, an efficient way of allocating these masks is desired.

SUMMARY

Disclosed are, inter alia, methods, apparatus, data structures, computer-readable medium, mechanisms, and means for reducing the number of block masks required for programming multiple access control lists in an associative memory.

One embodiment identifies a combined ordering of masks corresponding to multiple access control lists (ACLs), the multiple ACLs including n ACLs. A required ordering of masks for each of the n ACLs is identified. An n-dimensional array is generated, wherein each axis of the n-dimensional array corresponds to masks in their requisite order of a different one of the multiple ACLs. The n-dimensional array progressively identifies numbers of different masks required for subset orderings of masks required for subsets of the multiple ACLs. The n-dimensional array is traversed to identify a sequence (e.g., the order or reverse order) of masks corresponding to a single ordering of masks including masks required for each of the multiple ACLs. The single ordering of masks maintains the ordering of masks required for each of the multiple ACLs with one or more masks corresponding to a different ACL or other feature in between one or more consecutive masks of an ACL of the multiple ACLs.

In one embodiment, a last position identified by a last column and last row of the array identifies the number of different masks required for the single ordering of masks. In one embodiment, the matrix is traversed based on said numbers of different masks required for subset orderings of masks required for subsets of the multiple ACLs. One embodiment maintains indications from where said numbers of different masks required for subset orderings of masks required for subsets of the plurality of ACLs are generated, and the n-dimensional array is traversed based on said indications from where said numbers of different masks required for subset orderings of masks required for subsets of the plurality of ACLs are generated One embodiment populates multiple block masks of an associative memory with said masks required for the multiple ACLs such that the single ordering of masks is produced in the associative memory. Rather than combining all n ACLs at a time when n is greater than two, one embodiment successively combines two ACLs together, then combines that result with a next ACL, and so on.

One embodiment identifies a combined ordering of masks corresponding to a first ACL and a second ACL. A first ordering of masks required for the first ACL is identified. A second ordering of masks required the second ACL is identified. A matrix of the first and second orderings of masks is generated, with the matrix progressively identifying numbers of different masks required for subset orderings of masks required for subsets of the first and second ACLs. The matrix is traversed to identify a sequence (e.g., the order or reverse order) of masks corresponding to a single ordering of masks including masks required for the first ACL and the second ACL. The single ordering of masks maintains the first ordering and second orderings of masks with one or more masks corresponding to a different ACL or other feature in between one or more consecutive masks of the first and second ACLs.

In one embodiment, a last position identified by a last column and last row of the matrix identifies the number of different masks required for the single ordering of masks. In one embodiment, the matrix is traversed based on said numbers of different masks required for subset orderings of masks required for subsets of the first and second ACLs. One embodiment maintains indications from where said numbers of different masks required for subset orderings of masks required for subsets of the first and second ACLs are generated, and the matrix is traversed based on said indications from where said numbers of different masks required for subset orderings of masks required for subsets of the first and second ACLs are generated. One embodiment populates multiple block masks of an associative memory with said masks required for the first and second ACLs such that the single ordering of masks is produced in the associative memory.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIGS. 3A-C illustrate an array/matrix generated and traversed in one embodiment to identify a mask ordering;

FIG. 5 illustrates pseudo-code used in one embodiment for generating and traversing an array/matrix.

DETAILED DESCRIPTION

Figure 1A:
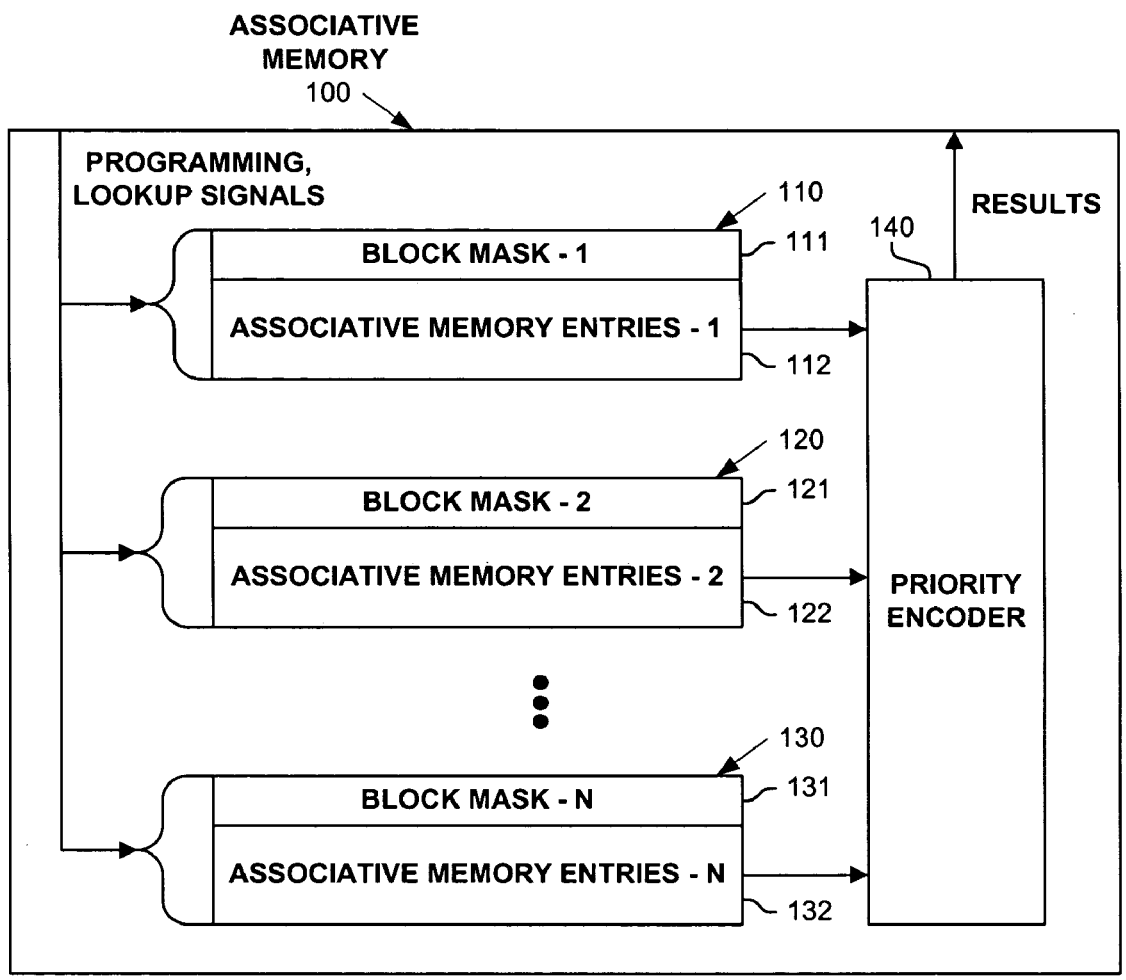
FIGS. 1A-B are block diagrams illustrating a prior art associative memory with block masks and prior art approaches for combining masks from two access control lists.
Figure 1B:
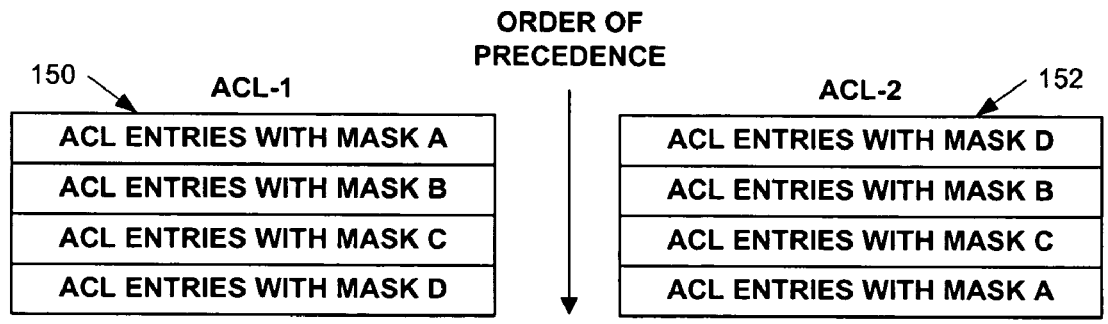
Figure 1B:
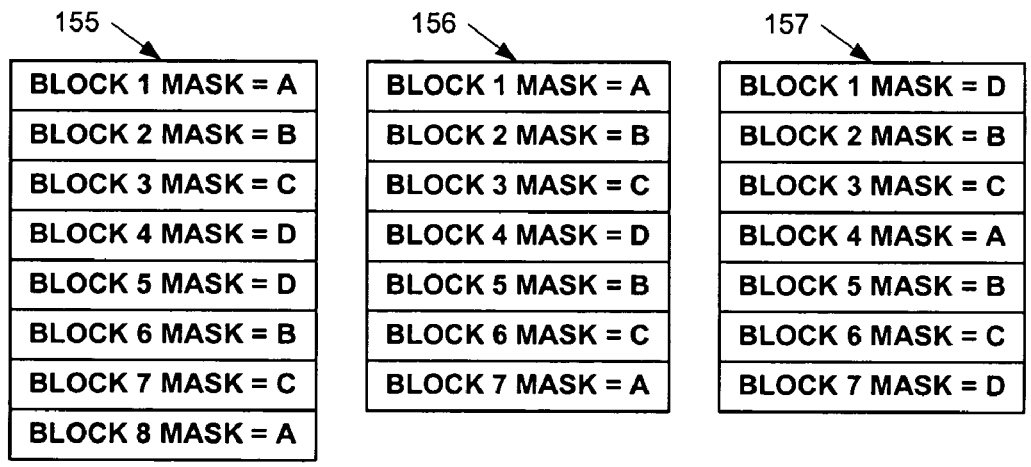

Disclosed are, inter alia, methods, apparatus, data structures, computer-readable medium, mechanisms, and means for reducing the number of block masks required for programming multiple access control lists in an associative memory.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc. The term "associative memory" is an extensible term, and refers to all types of known or future developed associative memories, including, but not limited to binary and ternary content addressable memories, hash tables, TRIE and other data structures, etc. Additionally, the term "associative memory unit" may include, but is not limited to one or more associative memory devices or parts thereof, including, but not limited to regions, segments, banks, pages, blocks, sets of entries, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items.

Disclosed are, inter alia, methods, apparatus, data structures, computer-readable medium, mechanisms, and means for reducing the number of block masks required for programming multiple access control lists in an associative memory.

One embodiment identifies a combined ordering of masks corresponding to multiple access control lists (ACLs), the multiple ACLs including n ACLs. A required ordering of masks for each of the n ACLs is identified. An n-dimensional array is generated, wherein each axis of the n-dimensional array corresponds to masks in their requisite order of a different one of the multiple ACLs. The n-dimensional array progressively identifies numbers of different masks required for subset orderings of masks required for subsets of the multiple ACLs. The n-dimensional array is traversed to identify a sequence (e.g., the order or reverse order) of masks corresponding to a single ordering of masks including masks required for each of the multiple ACLs. The single ordering of masks maintains the ordering of masks required for each of the multiple ACLs with one or more masks corresponding to a different ACL or other feature in between one or more consecutive masks of an ACL of the multiple ACLs.

In one embodiment, a last position identified by a last column and last row of the array identifies the number of different masks required for the single ordering of masks. In one embodiment, the matrix is traversed based on said numbers of different masks required for subset orderings of masks required for subsets of the multiple ACLs. One embodiment maintains indications from where said numbers of different masks required for subset orderings of masks required for subsets of the plurality of ACLs are generated, and the n-dimensional array is traversed based on said indications from where said numbers of different masks required for subset orderings of masks required for subsets of the plurality of ACLs are generated One embodiment populates multiple block masks of an associative memory with said masks required for the multiple ACLs such that the single ordering of masks is produced in the associative memory. Rather than combining all n ACLs at a time when n is greater than two, one embodiment successively combines two ACLs together, then combines that result with a next ACL, and so on.

One embodiment identifies a combined ordering of masks corresponding to a first ACL and a second ACL. A first ordering of masks required for the first ACL is identified. A second ordering of masks required the second ACL is identified. A matrix of the first and second orderings of masks is generated, with the matrix progressively identifying numbers of different masks required for subset orderings of masks required for subsets of the first and second ACLs. The matrix is traversed to identify a sequence (e.g., the order or reverse order) of masks corresponding to a single ordering of masks including masks required for the first ACL and the second ACL. The single ordering of masks maintains the first ordering and second orderings of masks with one or more masks corresponding to a different ACL or other feature in between one or more consecutive masks of the first and second ACLs.

In one embodiment, a last position identified by a last column and last row of the matrix identifies the number of different masks required for the single ordering of masks. In one embodiment, the matrix is traversed based on said numbers of different masks required for subset orderings of masks required for subsets of the first and second ACLs. One embodiment maintains indications from where said numbers of different masks required for subset orderings of masks required for subsets of the first and second ACLs are generated, and the matrix is traversed based on said indications from where said numbers of different masks required for subset orderings of masks required for subsets of the first and second ACLs are generated. One embodiment populates multiple block masks of an associative memory with said masks required for the first and second ACLs such that the single ordering of masks is produced in the associative memory.

Figure 2A:
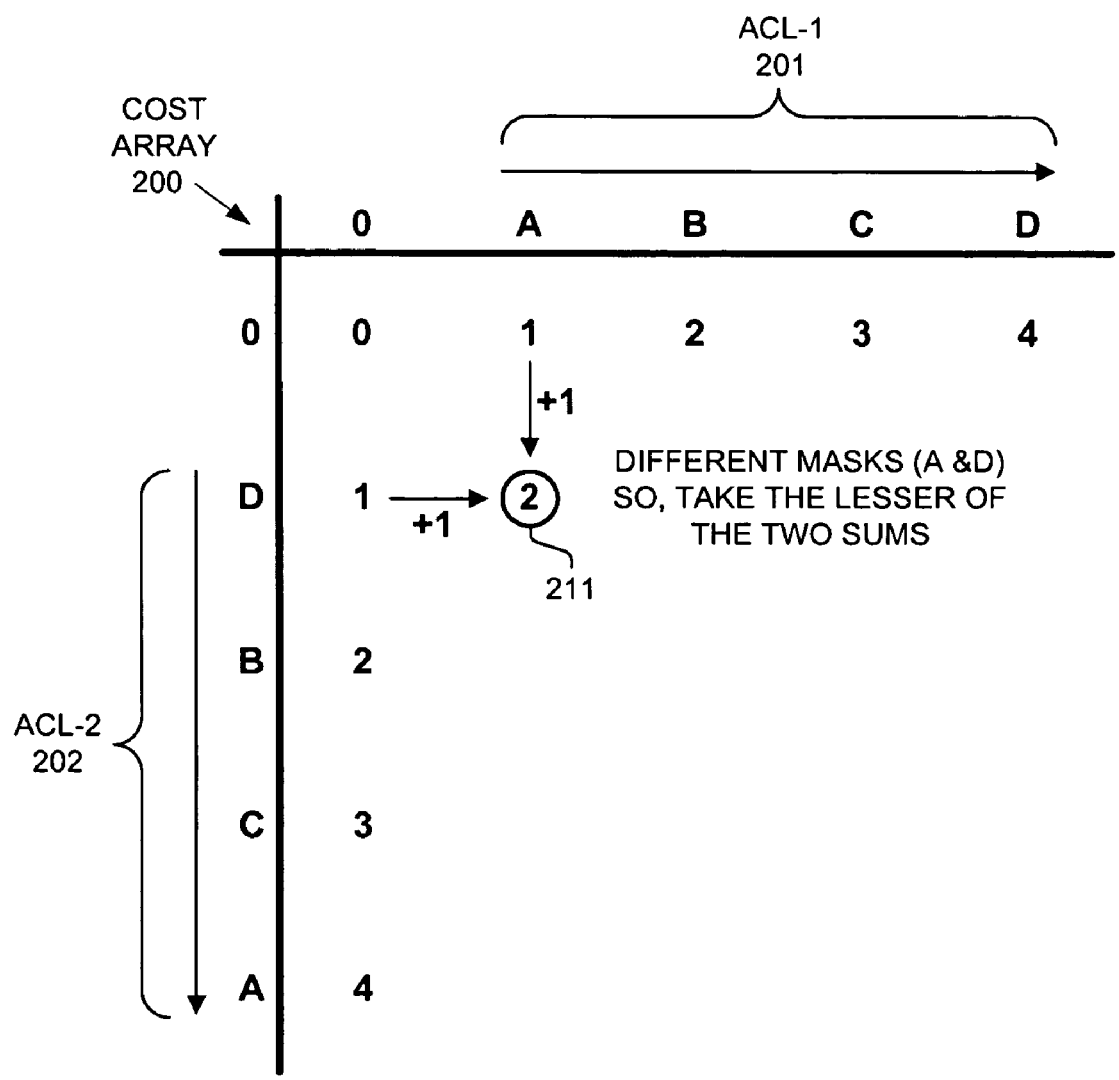
FIGS. 2A-2D illustrate the generation as performed in one embodiment of an array/matrix progressively identifying the number of different masks required for subset orderings of masks required for subsets of multiple ACLs.
Figure 2B:
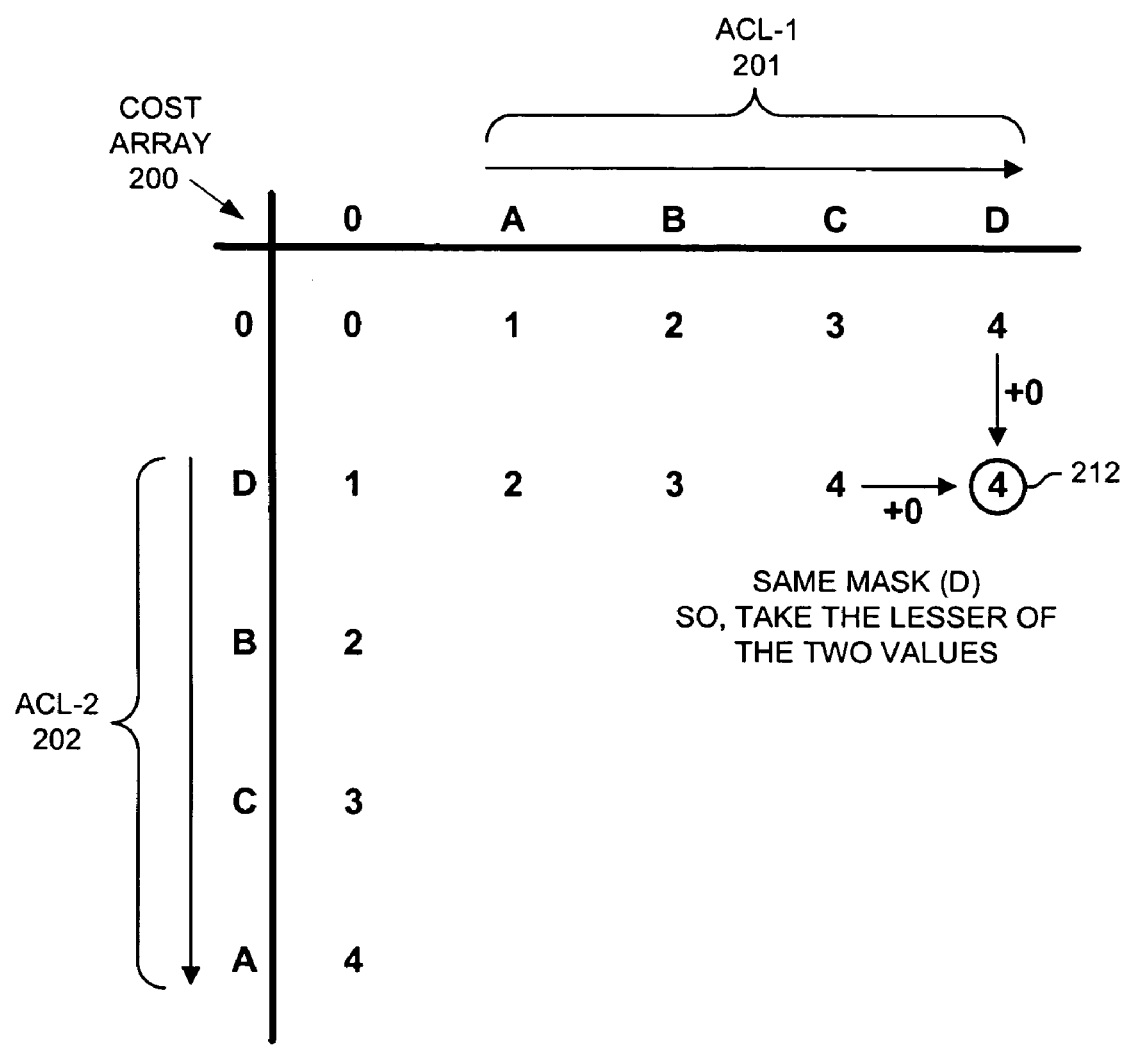
Figure 2C:
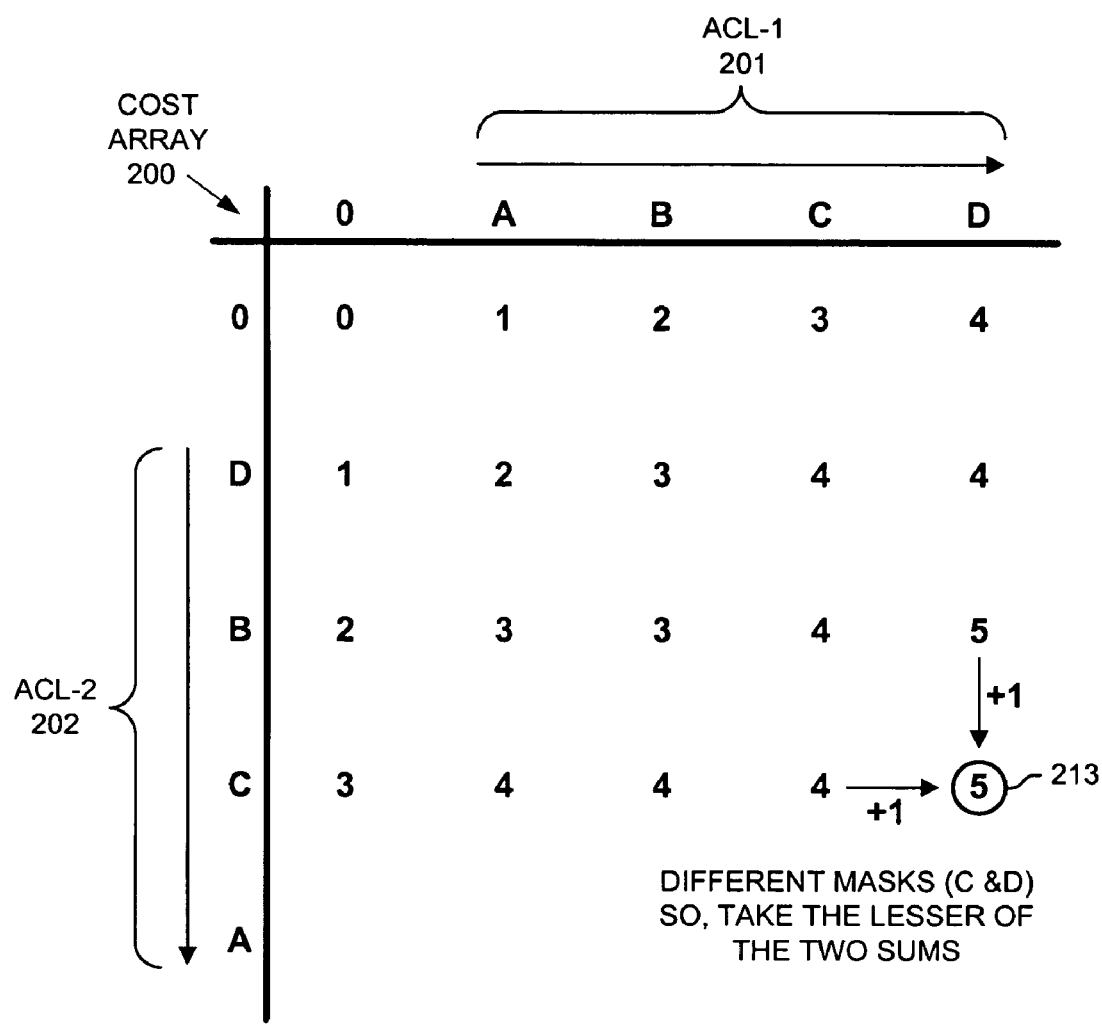
Figure 2D:
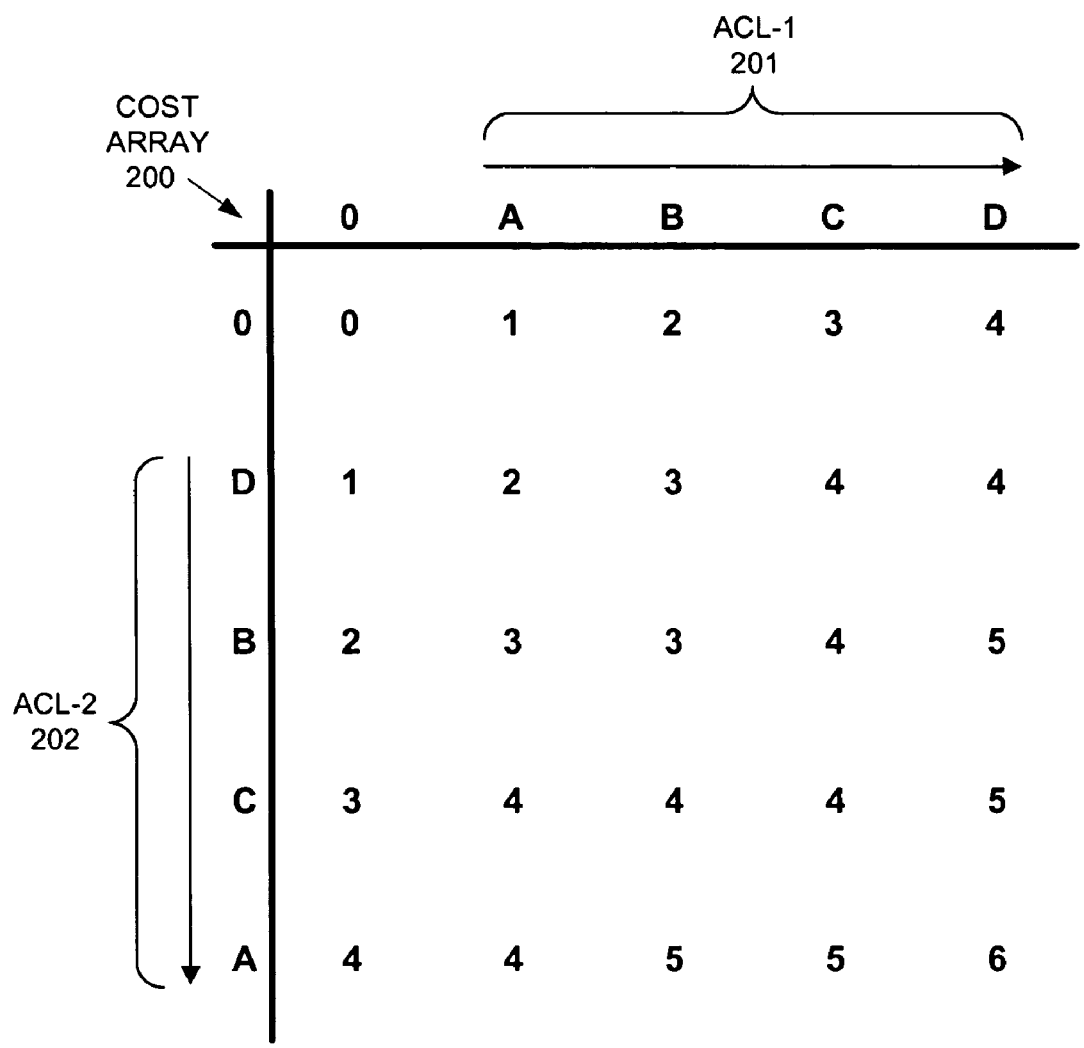
Figure 2E:
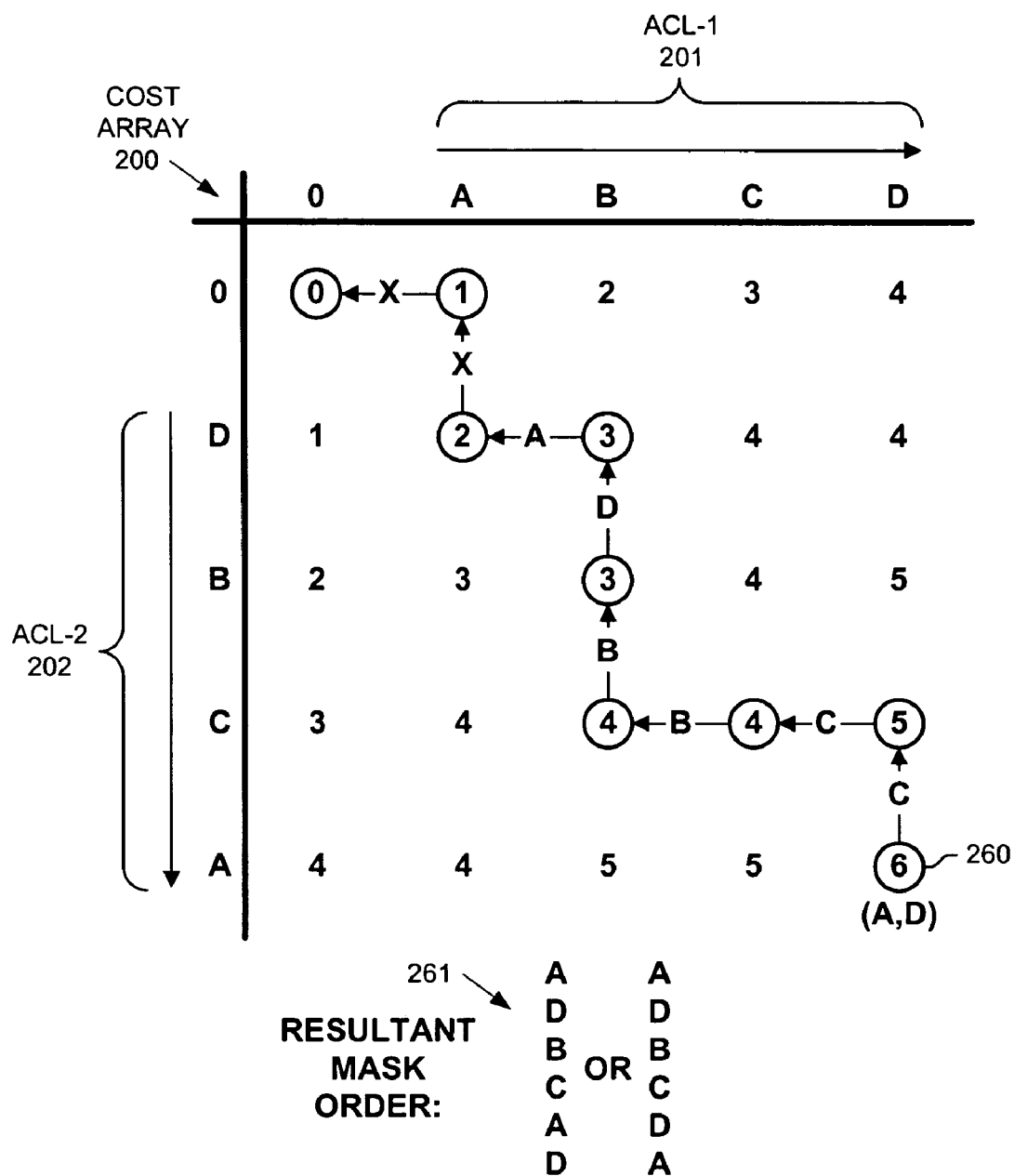
FIGS. 2E-F illustrate the traversal as performed in one embodiment of an array/matrix to identify a mask ordering.
Figure 2F:
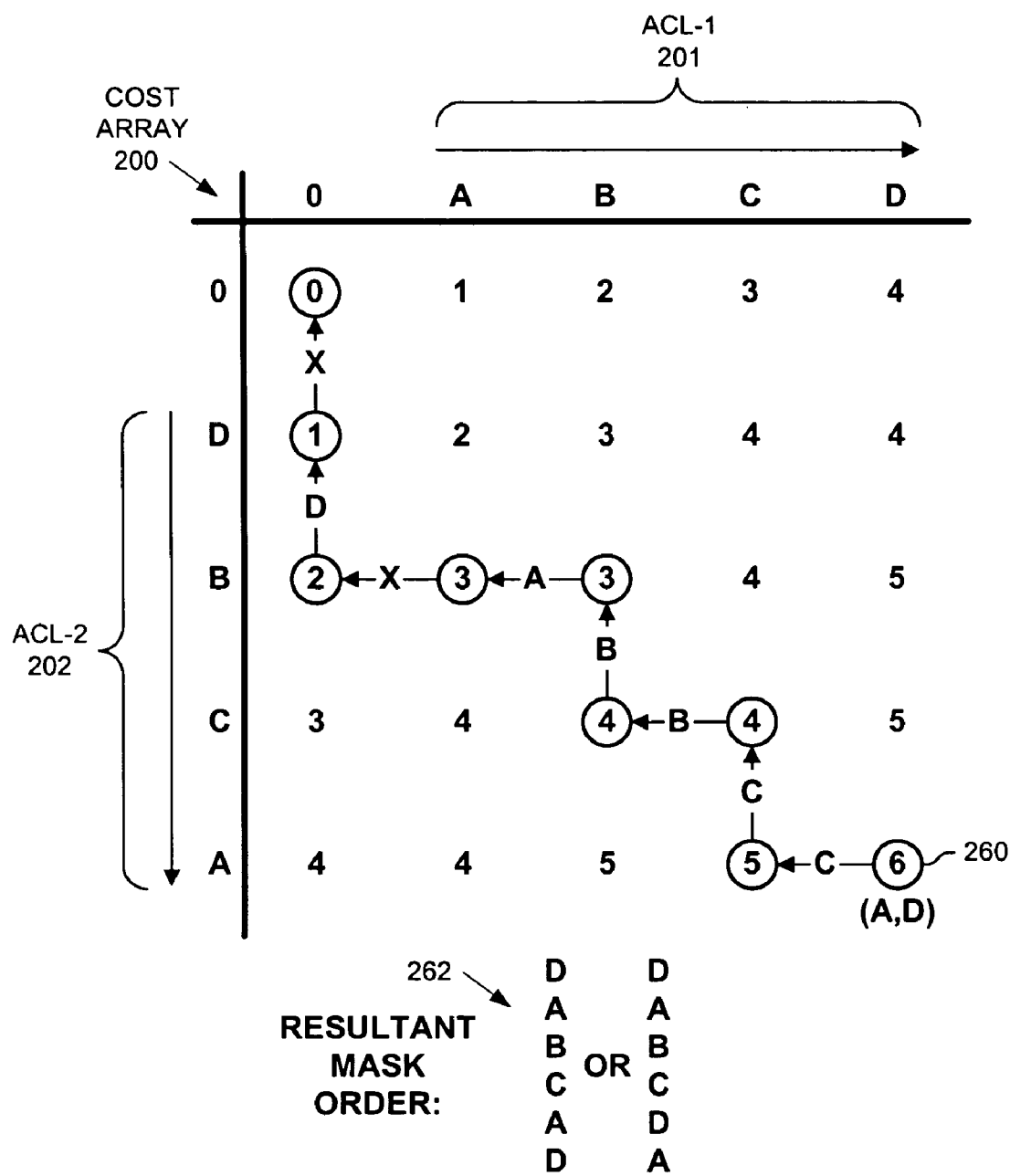

Turning to the figures, FIGS. 2A-2D illustrate the generation as performed in one embodiment of an array/matrix progressively identifying the number of different masks required for subset orderings of masks required for subsets of multiple ACLs, and FIGS. 2E-F illustrate the traversal as performed in one embodiment of an array/matrix to identify a mask ordering.

Illustrated in these figures is a cost array 200 generated for reducing the number of block masks required for programming multiple access control lists in an associative memory. Note, the term "array" is used herein in an extensible manner to refer to an array, matrix or other data structure. As shown, cost array 200 has a horizontal axis corresponding to ACL-1 (201) which has four masks (A-D), with a required order of A, B, C, and then D as shown on the horizontal axis. Cost array 200 has a vertical axis corresponding to ACL-2 (202) which has four masks (A-D), with a required order of D, B, C, and then A as shown on the vertical axis. Also, the first position of the cost array 200 is identified as (0,0), as the first column and row is identified by '0' indicating no corresponding mask required. Thus, as shown in the first column and row of cost array 200, the cost (i.e., the number of masks required) is just the number of masks required for a single ACL, i.e., ACL-1 (201) in the first row, and ACL-2 (202) in the first column. The generation of the costs for combinations of the ACLs 201 and 202 will now be described. Note, a mask can be shared in an associative memory employing block masks if a next entry uses the same mask and there remain free entries in the particular block of entries corresponding to the block mask.

As shown in FIG. 2A, the cost of position 211 is two, as it corresponds to two different masks (i.e., A and D) and thus the value of one is added to the lesser of the immediate previously horizontal and vertical positions. Thus, one plus one yields a cost of two for position 211.

As shown in FIG. 2B, more of cost array 200 has been generated. As shown, the value of position 212 is four, as it corresponds to the same mask (i.e., D) in both ACL-1 (201)and ACL-2 (202), and thus the lesser of the immediate previously horizontal and vertical positions is the value used for this position. Thus, four plus zero yields a cost of four for position 212.

As shown in FIG. 2C, the cost of position 213 is five, as it corresponds to two different masks (i.e., D and C) and thus the value of one is added to the lesser of the immediate previously horizontal and vertical positions. Thus, four plus one yields a cost of five for position 213.

FIG. 2D illustrates the completed generation of cost array 200. Note, the values stored in cost array 200 progressively identify the numbers of different masks required for subset orderings of masks, with the last column and last row position identifying a minimum number of different masks required for combination of the n access control lists, where in FIGS. 2A-F, the value of n is two for ease of illustration. However, this same process is used in combining masks required for n ACLs by generating and traversing an n-dimensional array. Also, n ACLs could be combined by combining two ACLs to produced a combined ACL, and then repeatedly combining the combined ACL with a next ACL until all n ACLs have been combined, or some variant thereof.

FIG. 2E illustrates the traversal of generated cost array 200 for identifying the ordering of masks, wherein the value of position 260 identifies the number of masks (i.e., six in this example). Position 260 corresponds to masks A and D, so either of these can be the last mask used. Then, to identify the reverse order (and thus the order) of masks, the traversal of cost array 200 begins at position 260, and follows a least cost path (i.e., either go up or left to the lesser cost value, or either if they are the same) through cost array 200 to the (0,0) position. This traversal path identifies the result and one or more mask orderings with the minimum number of different masks required (i.e., resultant mask order 261 for this example). Also, when using an n-dimensional array, this same traversal process is used with the traversal occurring in n dimensions.

As shown, in FIG. 2E, this inverse ordering is AD or DA, followed by C (the path goes vertical so take the value from the destination column), followed by C (the path goes horizontal so take the value from the destination row), followed by BBDA. Thus, removing the adjacent redundant values yields the ordering of ADBCAD or ADBCDA.

FIG. 2F shows a different traversal through the same cost array 200, which generates results 262 of DABCAD or DABCDA. Thus, as expected, six masks in a required order are generated irregardless of the least cost path traversed.

Figure 3B:
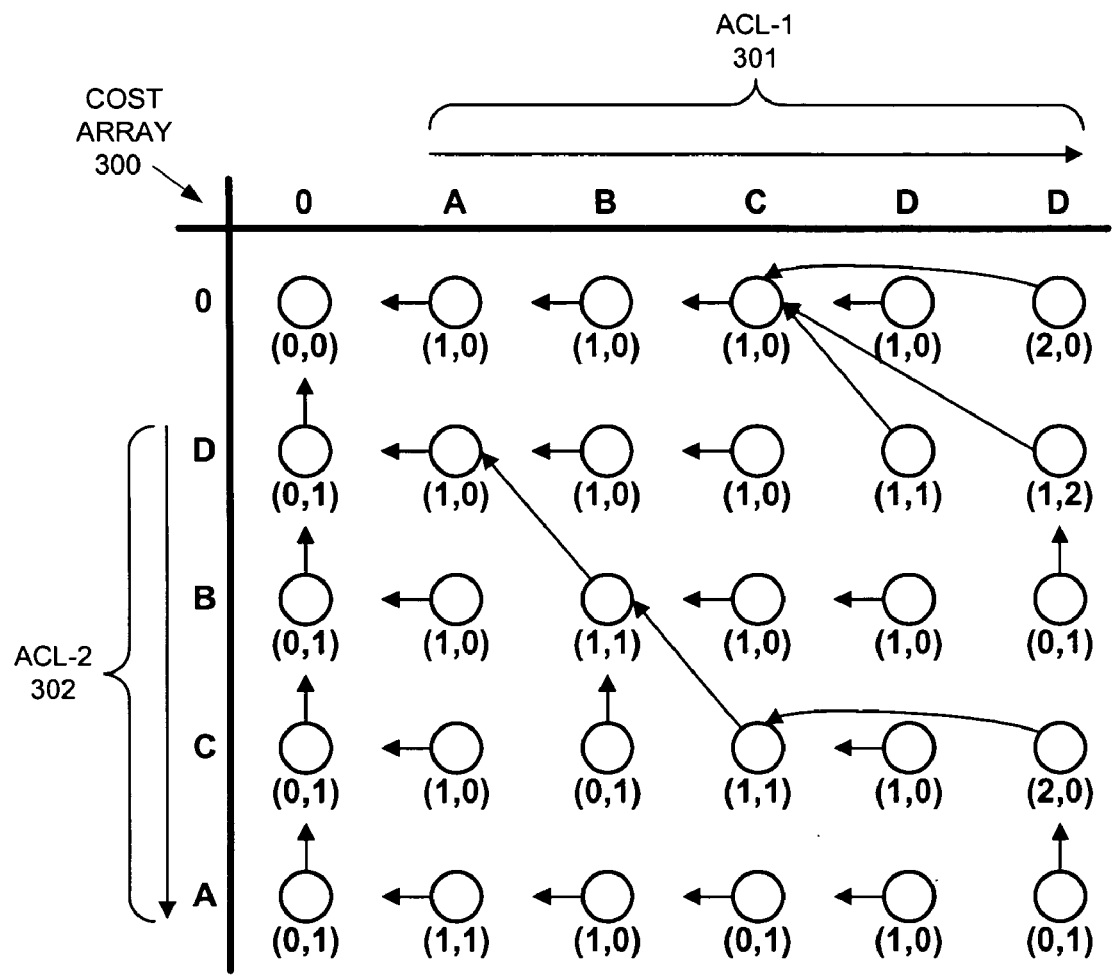
Figure 3C:
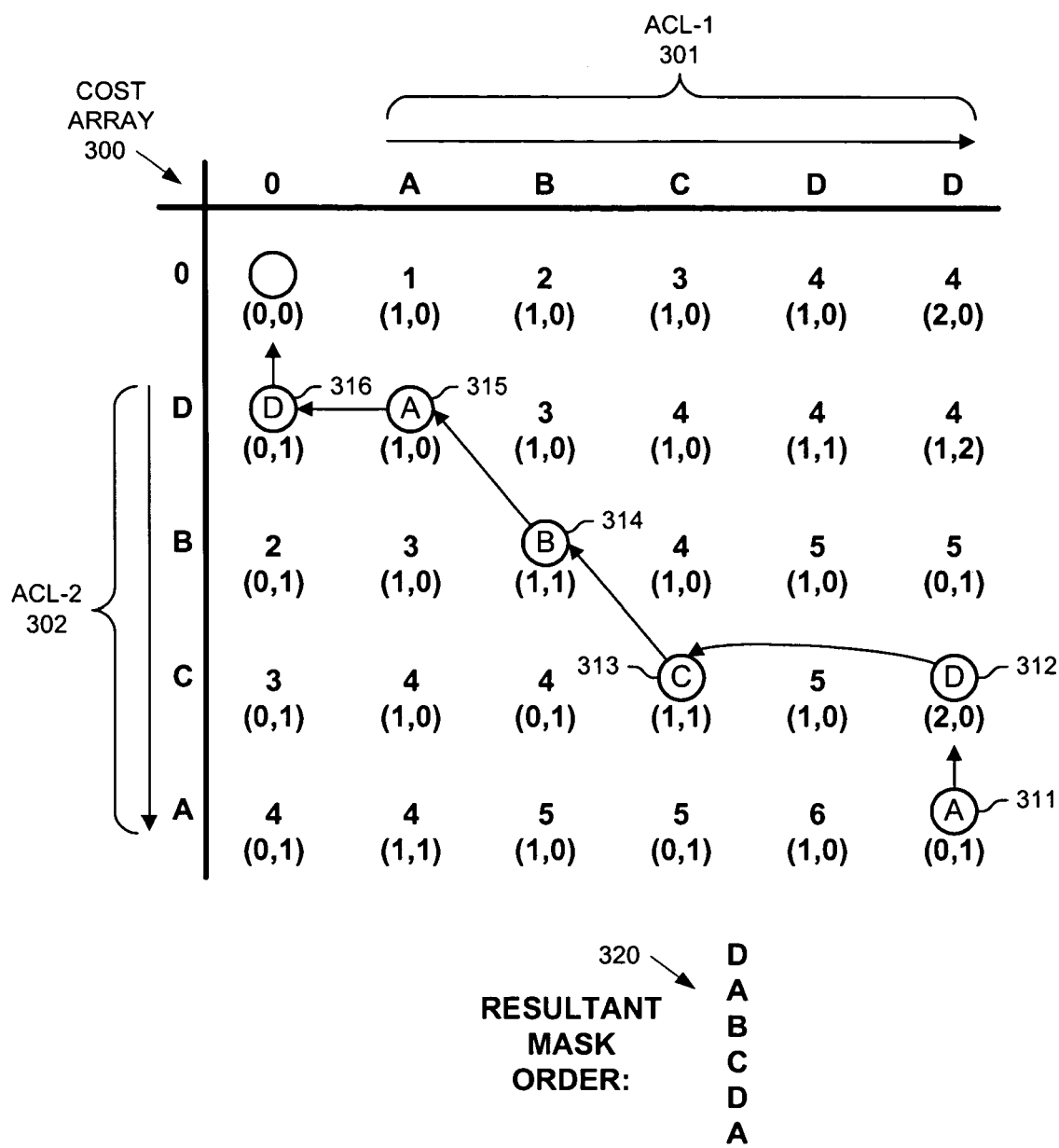

FIGS. 3A-C illustrate an array/matrix generated and traversed in one embodiment to identify a mask ordering. As shown in these figures, the cost array keeps track of from where the particular least cost values are derived. Although this may require additional storage, it makes traversal of the matrix more efficient. Also, it may produce an end result with fewer masks than that produced by the traversal illustrated in FIGS. 2E-F, as the traversal based on this derivation information can avoid a non-optimal path through the array induced when the traversal path is determined based only the information local to a particular point in the array.

Turning to FIG. 3A, cost array 300 is generated is the same manner previously described or an another manner for ACLs 301 and 302. Note, for illustrative purposes, an additional required mask of D has been added to ACL (when compared to ACL 201 of FIGS. 2A-F). Also, as illustrated, one embodiment maintains indications of from where the numbers of different masks are derived.

As shown in FIG. 3A, one embodiment uses an n-tuple or vector to identify which previous location in the array/matrix was used in deriving the value at a position. For example, tuple (1,0) 305 identifies that the previous position in the same row was used; tuple (0,1) 306 identifies that the previous position in the same column was used; tuple (1,1) 307 identifies that the position in the previous row and previous column was used; and tuple (2,0) 308 identifies that two previous positions in the same row was used.

FIG. 3B visually illustrates these vectors used in one embodiment, with their corresponding tuple values represented from FIG. 3A.

As shown in FIG. 3C, maintaining the indications from where the mask costs are derived can make identification of the resultant mask order very efficient. Starting with the last position 311, and traversing cost array 300 based on the vectors/tuples identifies the reverse mask order of masks ADCBAD (311-316). Note, for ease of illustration, the representation of the vectors not used in the traversal (shown in FIG. 3B) are not reproduced in FIG. 3C. The desired resultant mask order 320 is thus: DABCDA.

Figure 4A:
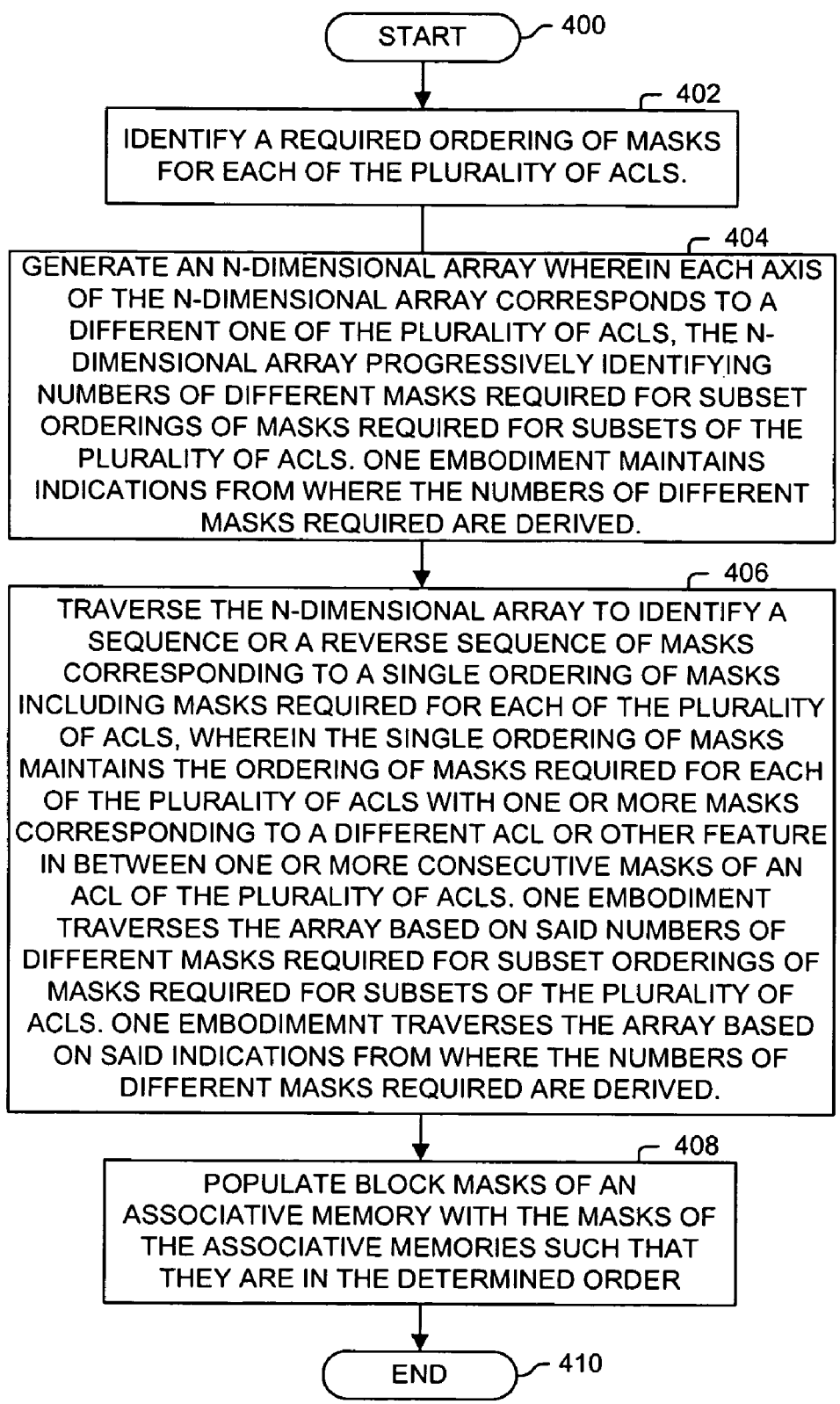
FIG. 4A is a flow diagram illustrating a process used in one embodiment for generating and traversing an array/matrix.

FIG. 4A illustrates a process used in one embodiment for identifying a combined ordering of masks corresponding to multiple access control lists (ACLs), the multiple ACLs including n ACLs. Processing beings with process block 400, and proceeds to process block 402, wherein a required ordering of masks for each of the n ACLs is identified. In process block 404, an n-dimensional array is generated, wherein each axis of the n-dimensional array corresponds to masks in their requisite order of a different one of the multiple ACLs. The n-dimensional array progressively identifies numbers of different masks required for subset orderings of masks required for subsets of the multiple ACLs. In one embodiment, a last position identified by a last column and last row of the array identifies the number of different masks required for the single ordering of masks. One embodiment maintains indications of where the numbers of different masks are derived.

Next, in process block 406, the n-dimensional array is traversed to identify a sequence (e.g., the order or reverse order) of masks corresponding to a single ordering of masks including masks required for each of the multiple ACLs. The single ordering of masks maintains the ordering of masks required for each of the multiple ACLs with one or more masks corresponding to a different ACL or other feature in between one or more consecutive masks of an ACL of the multiple ACLs. In one embodiment, the array is traversed based on said numbers of different masks required for subset orderings of masks required for subsets of the multiple ACLs. In one embodiment, the array is traversed based on the indications of where the numbers of different masks are derived.

Finally, in process block 408, the multiple block masks of an associative memory are populated with the masks required for the multiple ACLs. Processing is complete as indicated by process block 410.

Figure 4B:
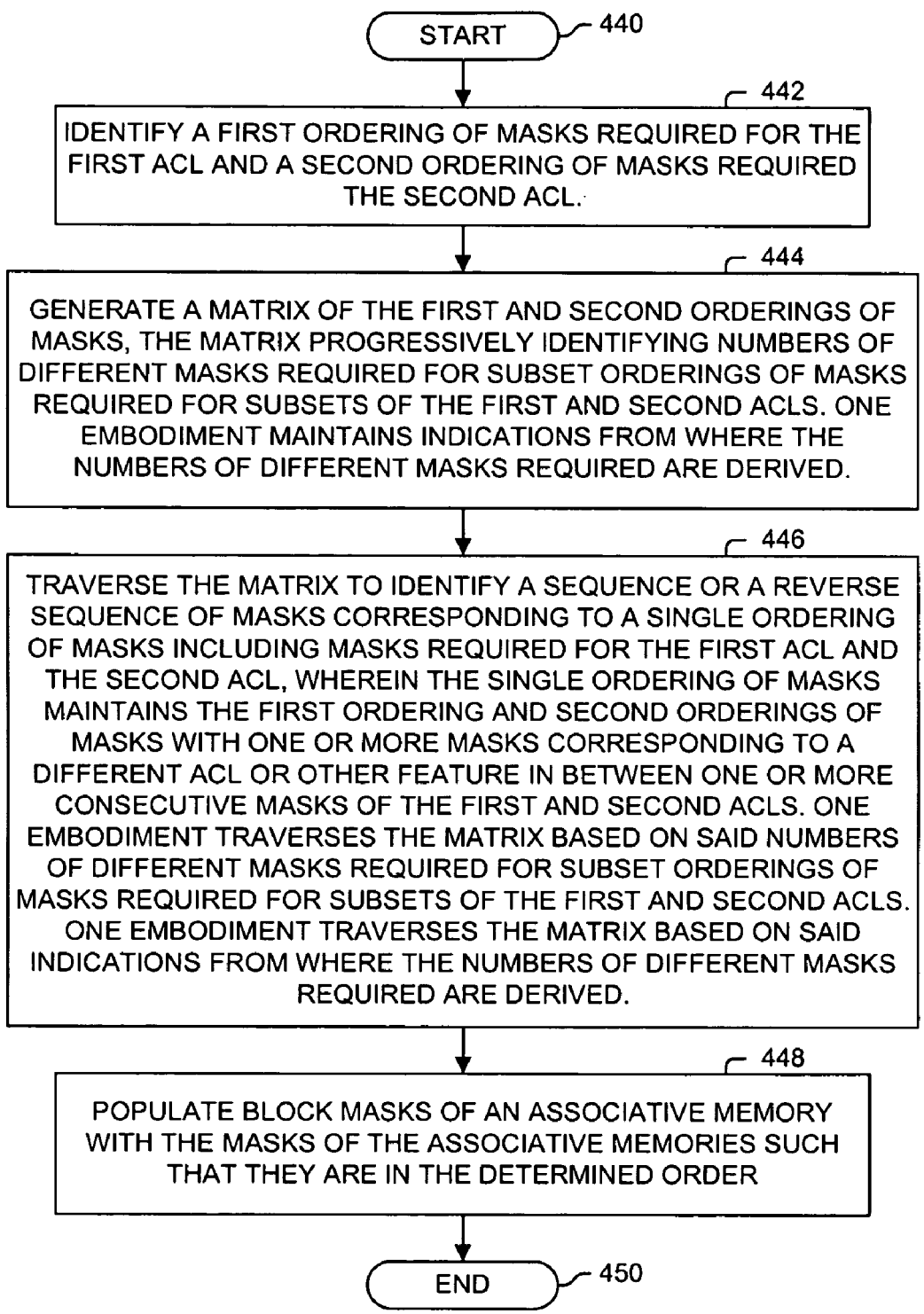
FIG. 4B is a flow diagram illustrating a process used in one embodiment for generating and traversing an array/matrix.

FIG. 4B illustrates a process used in one embodiment for a combined ordering of masks corresponding to a first ACL and a second ACL. Processing beings with process block 440, and proceeds to process block 442, wherein a first ordering of masks required for the first ACL is identified, and a second ordering of masks required the second ACL is identified. Next, in process block 444, a matrix of the first and second orderings of masks is generated, with the matrix progressively identifying numbers of different masks required for subset orderings of masks required for subsets of the first and second ACLs. One embodiment maintains indications of where the numbers of different masks are derived.

In process block 446, the matrix is traversed to identify a sequence (e.g., the order or reverse order) of masks corresponding to a single ordering of masks including masks required for the first ACL and the second ACL. The single ordering of masks maintains the first ordering and second orderings of masks with one or more masks corresponding to a different ACL or other feature in between one or more consecutive masks of the first and second ACLs. In one embodiment, a last position identified by a last column and last row of the matrix identifies the number of different masks required for the single ordering of masks. In one embodiment, the matrix is traversed based on said numbers of different masks required for subset orderings of masks required for subsets of the first and second ACLs. In one embodiment, the matrix is traversed based on said indications of where the numbers of different masks are derived.

One embodiment populates multiple block masks of an associative memory with said masks required for the first and second ACLs such that the single ordering of masks is produced in the associative memory.

Finally, in process block 448, the multiple block masks of an associative memory are populated with the masks required for the multiple ACLs. Processing is complete as indicated by process block 450.

Another way of viewing the identification of the ordering of masks is to define a cost function Cost(X, n), where X is the ACL, MAX is the maximum number of value entries with each mask entry. Thus, $$\text{Cost}(X,n)=0 \text{ if } n=0 \quad \text{Cost}(X,n-j)+1 \text{ where } x_n=x_{n-1}=\ldots=x_{n-j+1} \text{ and } 0\leq j\leq \text{MAX if } n>0$$

Problem statement: Given the ACLs $$X_1=<x_{11},x_{12},x_{13},\ldots x_{1n_1}>$$

$$X_2=<x_{21},x_{22},x_{23},\ldots,x_{2n_2}>$$

...

$$X_m=<x_{m1},x_{m2},x_{m3},\ldots,x_{mn_m}>$$

Compute Z, which is an ordering of the aces in $X_1$, $X_2$, ..., $X_m$ where $$Z=<z_1,z_2,\ldots,z_{(n1+n2+\ldots+nm)}>$$

such that $\forall \text{xij} 1\leq i\leq m, 1\leq j\leq n_i \exists z_k$ where $1\leq k\leq (n_1+n_2+\ldots+n_m)$ and if $x_{ij}=z_a$ and $x_{ik}=z_b$ and j<k then a<b and $\text{Cost}(Z, n_1+n_2+n_3+\ldots+n_m)$ is minimal.

Thus, for two ACLs, m=2 in the above problem statement and it reduces as follows.

$$fs(X,m)=0 \text{ if } m=0 \, j \text{ where } x_m=x_{m-1}=\ldots=x_{m-j+1}1 \text{ and } 1\leq j\leq \text{MAX}$$

$$V(X, Y : m, n) = \quad \text{Equation 1}$$
$$\text{Min}(V(X, Y : m-a, n), V(X, Y : m, n-b)) + \text{where } x_m \neq y_n$$
$$\min_{\forall i,j,i+j\leq \text{MAX}, i\leq a, j\leq b}(V(X, Y : m-i, n-j)) +$$
$$1 \text{ where } x_m = y_n \text{ where } a = f_s(X, m), b = f_s(Y, n)$$

For two ACLs, $X_1$ and $X_2$, m=2 and the solution to the above recurrence relation $V(X_1, X_2: x_{1n_1}, x_{2n_2})$ gives the optimal number of masks required. FIG. 5 illustrates pseudo-code 500 for generating and traversing a matrix to identify the ordering of the masks to use. The process illustrated in pseudo-code 400 is a formalization of that previously described herein, so this discussion will not be repeated.

The time requirement for the algorithm [Min_Masks and Find_Optimized_ACL] is O(mn) where m is the number of aces in $\text{ACL}_a$ and n is the number of aces in $\text{ACL}_b$. The space requirement is O(mn).

This algorithm can be easily extended to more than two ACLs as illustrated in the pseudo-code below. Using the above approach the time requirement is $O(m_1 m_2 m_3 \ldots m_n)$ where $\text{ACL}_a$ ha $m_1$ aces, $\text{ACL}_b$ has $m_2$ aces ... and $\text{ACL}_n$ has $m_n$ aces. The space requirement is $O(m_1 m_2 \ldots m_n)$.

Result⇐NULL for (i=1; i<no of ACLs; i++)

Result⇐{Min_Masks(Result, $\text{Acl}_i$); Find_Optimized_Acl(Result, $\text{ACL}_i$)};

With the above the time requirement is the order of $$O\left(\sum_{j=1}^{n-1} mj \cdot \sum_{i=j+1}^{n} mi\right)$$

which is $O(m^3)$ when $m_1=m_2=\ldots=m_n$ and the space requirement is $O(nm^2)$.

Figure 6A:
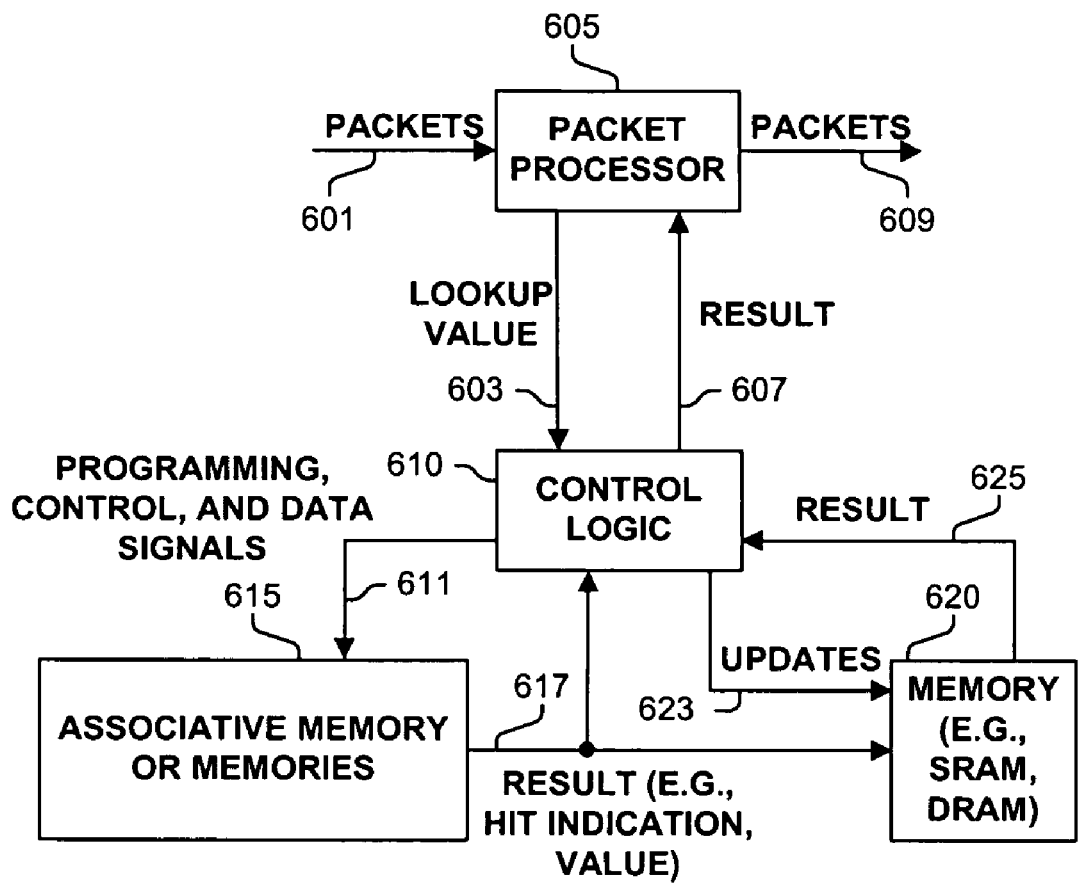
FIGS. 6A-C are block diagrams of various exemplary systems including one or more embodiments for reducing the number of block masks required for programming multiple access control lists in an associative memory and/or for performing lookup operations on the programmed associative memories.

FIGS. 6A-F are block diagrams of various exemplary systems including one or more embodiments for reducing the number of block masks required for programming multiple access control lists in an associative memory and/or for performing lookup operations on the programmed associative memories. First, FIG. 6A illustrates one embodiment of a system, which may be part of a router or other communications or computer system, for determining a reduced number of block masks, for programming corresponding entries and block masks in one or more associative memories, and for performing lookup operations to produce results which can be used in the processing of packets. In one embodiment, control logic 610 determines the required ordering of block masks for multiple ACLs and, via signals 611, programs and updates associative memory or memories 615. In one embodiment, control logic 610 also programs memory 620 via signals 623. In one embodiment, control logic 610 includes custom circuitry, such as, but not limited to discrete circuitry, ASICs, memory devices, processors, etc.

In one embodiment, packets 601 are received by packet processor 605. In addition to other operations (e.g., packet routing, security, etc.), packet processor 605 typically generates one or more items, including, but not limited to one or more packet flow identifiers based on one or more fields of one or more of the received packets 601 and possibly from information stored in data structures or acquired from other sources. Packet processor 605 typically generates a lookup value 603 which is provided to control logic 610 for providing control and data information to associative memory or memories 615, which perform lookup operations and generate one or more results 617. In one embodiment, a result 617 is used is by memory 620 to produce a result 625. Control logic 610 then relays result 607, based on result 617 and/or result 625, to packet processor 605. In response, one or more of the received packets are manipulated and forwarded by packet processor 605 as indicated by packets 609. Note, results 617, 625 and 607 may include indications of error conditions.

Figure 6B:
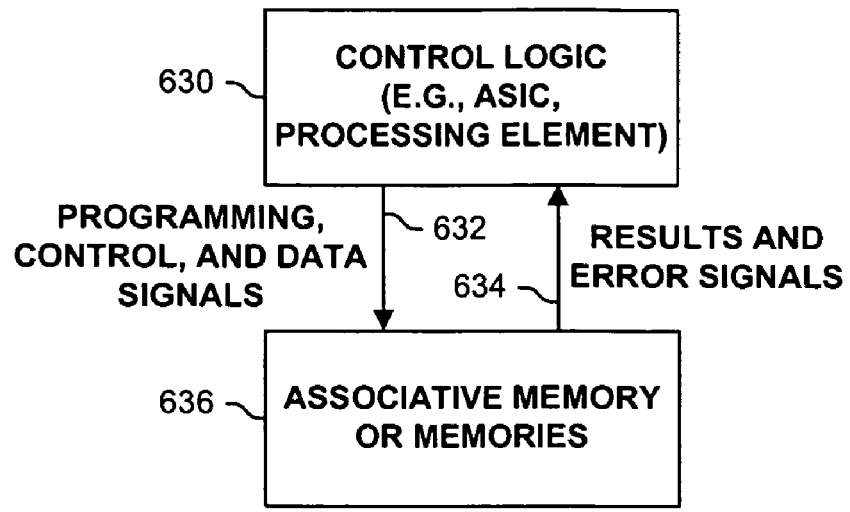

FIG. 6B illustrates one embodiment of a system, which may be part of a router or other communications or computer system, for determining a reduced number of block masks, for programming corresponding entries in one or more associative memories, and for performing lookup operations on the one or more associative memories. In one embodiment, control logic 630 determines the required ordering of block masks for multiple ACLs and, via signals 632, programs associative memory or memories 636. In addition, control logic 630 provides control and data information (e.g., lookup words, modification data, profile IDs, etc.) to associative memory or memories 636, which perform lookup operations to generate results and error signals 634, which are received by control logic 630.

Figure 6C:
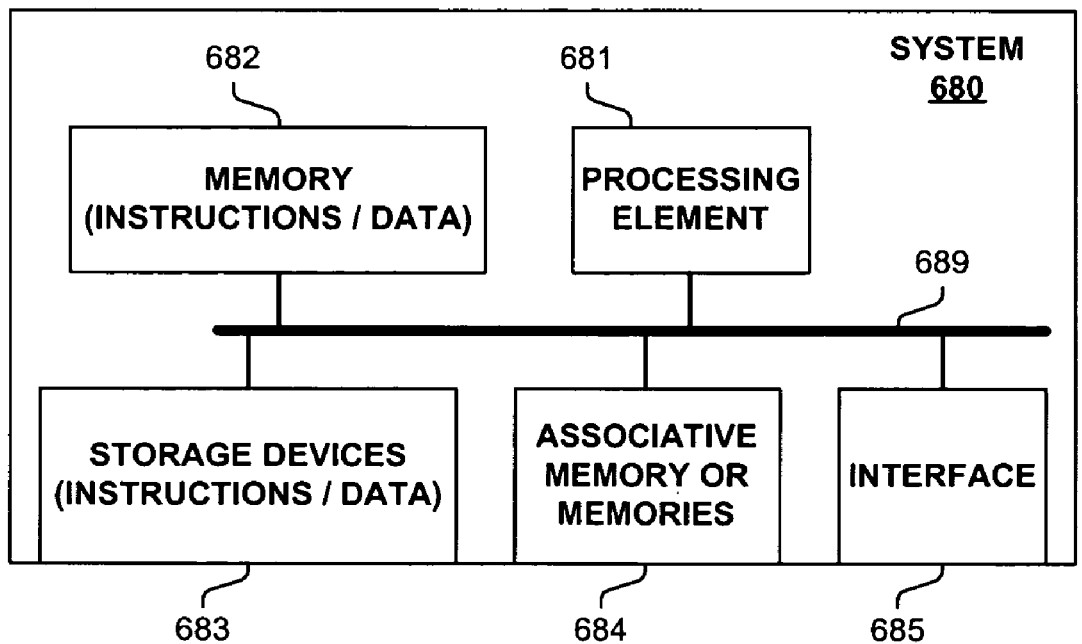

FIG. 6C illustrates one embodiment of a system 680, which may be part of a router or other communications or computer system, for determining a reduced number of block masks, for programming corresponding entries in one or more associative memories, and for performing lookup operations on the one or more associative memories. In one embodiment, system or component 680 performs one or more processes corresponding to one of the diagrams illustrated herein or otherwise described herein.

In one embodiment, system 680 includes a processing element 681, memory 682, storage devices 683, one or more block mask associative memories 684, and an interface 685 for connecting to other devices, which are coupled via one or more communications mechanisms 689 (shown as a bus for illustrative purposes). In one embodiment, processing element 681 determines the required ordering of block masks for multiple ACLs and programs the block masks of one or more associative memories 684.

Various embodiments of system 680 may include more or less elements. The operation of system 680 is typically controlled by processing element 681 using memory 682 and storage devices 683 to perform one or more tasks or processes, such as programming and performing lookup operations using associative memory or memories 684. Memory 682 is one type of computer readable medium, and typically comprises random access memory (RAM), read only memory (ROM), flash memory, integrated circuits, and/or other memory components. Memory 682 typically stores computer executable instructions to be executed by processing element 681 and/or data which is manipulated by processing element 681 for implementing functionality in accordance with one embodiment of the invention. Storage devices 683 are another type of computer readable medium, and typically comprise solid state storage media, disk drives, diskettes, networked services, tape drives, and other storage devices. Storage devices 683 typically store computer executable instructions to be executed by processing element 681 and/or data which is manipulated by processing element 681 for implementing functionality in accordance with one embodiment of the invention.

In one embodiment, processing element 681 provides control and data information (e.g., lookup words, modification data, profile IDs, etc.) to associative memory or memories 684, which perform lookup operations to generate lookup results and possibly error indications, which are received and used by processing element 681 and/or communicated to other devices via interface 685.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method for identifying a combined ordering of masks corresponding to a plurality of access control lists (ACLs), the plurality of ACLs including n ACLs, with n being an integer greater than one, the method comprising:

identifying a required ordering of masks for each of the plurality of ACLs;

generating an n-dimensional array wherein each axis of the n-dimensional array corresponds to masks in their said requisite order of a different one of the plurality of ACLs, the n-dimensional array progressively identifying numbers of different masks required for subset orderings of masks required for subsets of the plurality of ACLs; and traversing the n-dimensional array to identify a sequence of masks corresponding to a single ordering of masks including masks required for each of the plurality of ACLs, wherein the single ordering of masks maintains the ordering of masks required for each of the plurality of ACLs with one or more masks corresponding to a different ACL or other feature in between one or more consecutive masks of an ACL of the plurality of ACLs.

2. The method of claim 1, wherein a last position identified by a last column and last row of the array identifies the number of different masks required for the single ordering of masks.

3. The method of claim 1, wherein the n-dimensional array is traversed based on said numbers of different masks required for subset orderings of masks required for subsets of the plurality of ACLs.

4. The method of claim 1, wherein said generating the n-dimensional array includes maintaining indications from where said numbers of different masks required for subset orderings of masks required for subsets of the plurality of ACLs are generated; and wherein the n-dimensional array is traversed based on said indications from where said numbers of different masks required for subset orderings of masks required for subsets of the plurality of ACLs are generated.

5. The method of claim 1, comprising populating a plurality of block masks of an associative memory with said masks required for the plurality of ACLs such that the single ordering of masks is produced in the associative memory.

6. An apparatus comprising one or more processors and a memory, wherein the memory stores one or more instructions that, when executed by the one or more processors, perform steps for identifying a combined ordering of masks corresponding to a plurality of access control lists (ACLs), the plurality of ACLs including n ACLs, with n being an integer greater than one, said steps comprising:

identifying a required ordering of masks for each of the plurality of ACLs;

generating an n-dimensional array wherein each axis of the n-dimensional array corresponds to masks in their said requisite order of a different one of the plurality of ACLs, the n-dimensional array progressively identifying numbers of different masks required for subset orderings of masks required for subsets of the plurality of ACLs; and traversing the n-dimensional array to identify a sequence of masks corresponding to a single ordering of masks including masks required for each of the plurality of ACLs, wherein the single ordering of masks maintains the ordering of masks required for each of the plurality of ACLs with one or more masks corresponding to a different ACL or other feature in between one or more consecutive masks of an ACL of the plurality of ACLs.

7. The apparatus of claim 6, wherein a last position identified by a last column and last row of the array identifies the number of different masks required for the single ordering of masks.

8. The apparatus of claim 6, wherein the n-dimensional array is traversed based on said numbers of different masks required for subset orderings of masks required for subsets of the plurality of ACLs.

9. The apparatus of claim 6, wherein said generating the n-dimensional array includes maintaining indications from where said numbers of different masks required for subset orderings of masks required for subsets of the plurality of ACLs are generated; and wherein the n-dimensional array is traversed based on said indications from where said numbers of different masks required for subset orderings of masks required for subsets of the plurality of ACLs are generated.

10. The apparatus of claim 6, wherein said steps comprise populating a plurality of block masks of an associative memory with said masks required for the plurality of ACLs such that the single ordering of masks is produced in the associative memory.

11. An apparatus for identifying a combined ordering of masks corresponding to a plurality of access control lists (ACLs), the plurality of ACLs including n ACLs, with n being an integer greater than one, the method comprising:
means for generating an n-dimensional array wherein each axis of the n-dimensional array corresponds to masks in a required ordering for a different one of the plurality of ACLs with, the n-dimensional array progressively identifying numbers of different masks required for subset orderings of masks required for subsets of the plurality of ACLs; and
means for traversing the n-dimensional array to identify a sequence of masks corresponding to a single ordering of masks including masks required for each of the plurality of ACLs, wherein the single ordering of masks maintains the ordering of masks required for each of the plurality of ACLs with one or more masks corresponding to a different ACL or other feature in between one or more consecutive masks of an ACL of the plurality of ACLs.

12. The apparatus of claim 11, wherein a last position identified by a last column and last row of the array identifies the number of different masks required for the single ordering of masks.

13. The apparatus of claim 11, wherein said means for traversing the n-dimensional array includes means for traversing the n-dimensional array based on said numbers of different masks required for subset orderings of masks required for subsets of the plurality of ACLs.

14. The apparatus of claim 11, wherein said means for generating the n-dimensional array includes means for maintaining indications from where said numbers of different masks required for subset orderings of masks required for subsets of the plurality of ACLs are generated; and wherein said means for traversing the n-dimensional array includes means for traversing the n-dimensional array based on said indications from where said numbers of different masks required for subset orderings of masks required for subsets of the plurality of ACLs are generated.

15. The apparatus of claim 11, comprising means for populating a plurality of block masks of an associative memory with said masks required for the plurality of ACLs such that the single ordering of masks is produced in the associative memory.

16. A method for identifying a combined ordering of masks corresponding to a first access control list (ACL) and a second ACL, the method comprising:
identifying a first ordering of masks required for the first ACL;
identifying a second ordering of masks required the second ACL;
generating a matrix of the first and second orderings of masks, the matrix progressively identifying numbers of different masks required for subset orderings of masks required for subsets of the first and second ACLs; and
traversing the matrix to identify a sequence of masks corresponding to a single ordering of masks including masks required for the first ACL and the second ACL, wherein the single ordering of masks maintains the first ordering and second orderings of masks with one or more masks corresponding to a different ACL or other feature in between one or more consecutive masks of the first and second ACLs.

17. The method of claim 16, wherein a last position identified by a last column and last row of the matrix identifies the number of different masks required for the single ordering of masks.

18. The method of claim 16, wherein the matrix is traversed based on said numbers of different masks required for subset orderings of masks required for subsets of the first and second ACLs.

19. The method of claim 16, wherein said generating the matrix includes maintaining indications from where said numbers of different masks required for subset orderings of masks required for subsets of the first and second ACLs are generated; and wherein the matrix is traversed based on said indications from where said numbers of different masks required for subset orderings of masks required for subsets of the first and second ACLs are generated.

20. The method of claim 16, comprising populating a plurality of block masks of an associative memory with said masks required for the first and second ACLs such that the single ordering of masks is produced in the associative memory.

21. An apparatus comprising one or more processors and a memory, wherein the memory stores one or more instructions that, when executed by the one or more processors, perform steps for identifying a combined ordering of masks corresponding to a first access control list (ACL) and a second ACL, said steps comprising:
identifying a first ordering of masks required for the first ACL;
identifying a second ordering of masks required the second ACL;
generating a matrix of the first and second orderings of masks, the matrix progressively identifying numbers of different masks required for subset orderings of masks required for subsets of the first and second ACLs; and
traversing the matrix to identify a sequence of masks corresponding to a single ordering of masks including masks required for the first ACL and the second ACL, wherein the single ordering of masks maintains the first ordering and second orderings of masks with one or more masks corresponding to a different ACL or other feature in between one or more consecutive masks of the first and second ACLs.

22. The apparatus of claim 21, wherein a last position identified by a last column and last row of the matrix identifies the number of different masks required for the single ordering of masks.

23. The apparatus of claim 21, wherein the matrix is traversed based on said numbers of different masks required for subset orderings of masks required for subsets of the first and second ACLs.

24. The apparatus of claim 21, wherein said generating the matrix includes maintaining indications from where said numbers of different masks required for subset orderings of masks required for subsets of the first and second ACLs are generated; and wherein the matrix is traversed based on said indications from where said numbers of different masks required for subset orderings of masks required for subsets of the first and second ACLs are generated.

25. The apparatus of claim 21, wherein said steps comprise populating a plurality of block masks of an associative memory with said masks required for the first and second ACLs such that the single ordering of masks is produced in the associative memory.

26. An apparatus for identifying a combined ordering of masks corresponding to a first access control list (ACL) and a second ACL, the method comprising:
   means for generating a matrix with a first axis corresponding to a first ordering of masks required for the first ACL and a second axis corresponding to a second ordering of masks required the second ACL, the matrix progressively identifying numbers of different masks required for subset orderings of masks required for subsets of the first and second ACLs; and
   means for traversing the matrix to identify a sequence of masks corresponding to a single ordering of masks including masks required for the first ACL and the second ACL, wherein the single ordering of masks maintains the first ordering and second orderings of masks with one or more masks corresponding to a different ACL or other feature in between one or more consecutive masks of the first and second ACLs.

27. The apparatus of claim 26, wherein a last position identified by a last column and last row of the matrix identifies the number of different masks required for the single ordering of masks.

28. The apparatus of claim 26, wherein said means for traversing the matrix includes means for traversing the matrix based on said numbers of different masks required for subset orderings of masks required for subsets of the first and second ACLs.

29. The apparatus of claim 26, wherein said means for generating the matrix includes means for maintaining indications from where said numbers of different masks required for subset orderings of masks required for subsets of the first and second ACLs are generated; and wherein said means for traversing the matrix includes means for traversing the matrix based on said indications from where said numbers of different masks required for subset orderings of masks required for subsets of the first and second ACLs are generated.

30. The apparatus of claim 26, comprising means for populating a plurality of block masks of an associative memory with said masks required for the first and second ACLs such that the single ordering of masks is produced in the associative memory.

* * * * *

UNITED STATES PATENT AND TRADEMARK OFFICE
CERTIFICATE OF CORRECTION

PATENT NO. : 7,249,228 B1  Page 1 of 1
APPLICATION NO. : 10/791632
DATED : July 24, 2007
INVENTOR(S) : Agarwal et al.

It is certified that error appears in the above-identified patent and that said Letters Patent is hereby corrected as shown below:

Title Pg, Item (54), replace "CONTROL LIST" with -- CONTROL LISTS --

Col. 1, line 3, "CONTROL LIST" with -- CONTROL LISTS --

Col. 11, line 24, replace "0<=j<=MAX" with -- 0<j<=MAX --

Col. 11, line 42, replace "xij1" with -- $x_{ij}$ 1 --

Col. 11, line 48, replace "=$x_{m-j+1}$1" with -- $x_{m-j+1}$ --

Col. 11, line 53, replace "+ where" with -- + 1 where --

Signed and Sealed this

Twenty-ninth Day of December, 2009

David J. Kappos
*Director of the United States Patent and Trademark Office*